J. G. BRIDENSTINE.
ONE WHEEL HARROW CART.
APPLICATION FILED JULY 9, 1917.
1,255,509.
Patented Feb. 5, 1918.
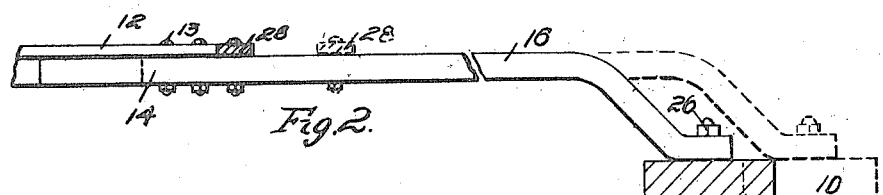
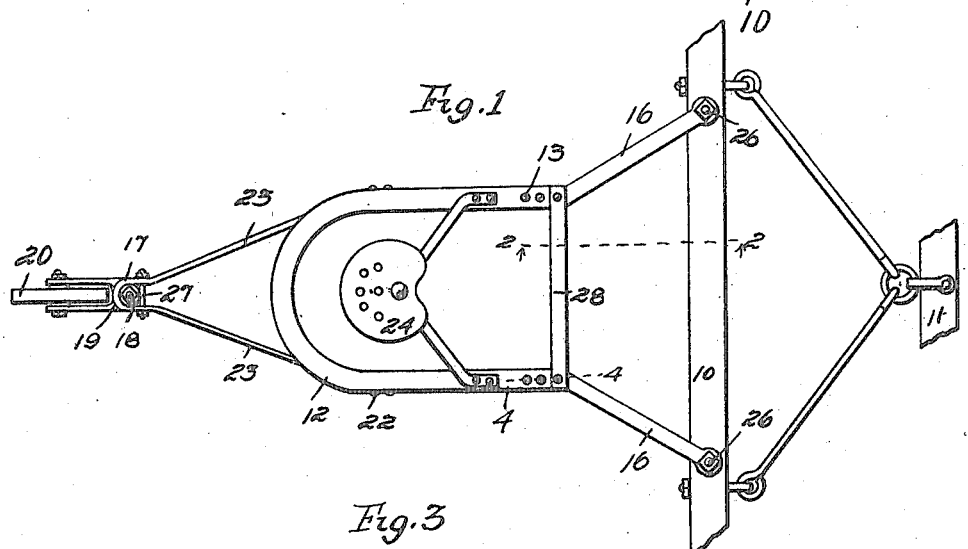
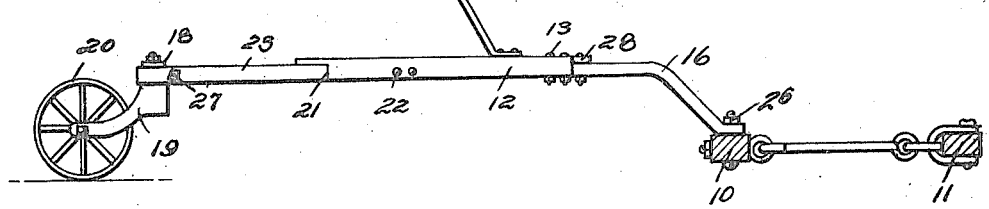
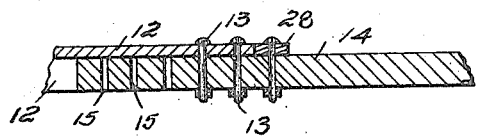
Witness
Inventor
Jay G. Bridenstine
By Orwig & Bair
Attorneys

UNITED STATES PATENT OFFICE.

JAY GOULD BRIDENSTINE, OF AUDUBON, IOWA.

ONE-WHEEL HARROW-CART.

1,255,509.    Specification of Letters Patent.    Patented Feb. 5, 1918.

Application filed July 9, 1917.  Serial No. 179,554.

*To all whom it may concern:*

Be it known that I, JAY GOULD BRIDENSTINE, a citizen of the United States, and resident of Audubon, and in the county of Audubon and State of Iowa, have invented a certain new and useful One-Wheel Harrow-Cart, of which the following is a specification.

The object of my invention is to provide a one-wheel harrow cart of very simple and durable construction, which is so built that it can be made at a comparatively small expense, on account of the small amount of material used and the simplicity and small number of the parts.

A further object is to provide such a device capable of longitudinal adjustment for increasing or decreasing the total length of the harrow cart for adjusting it for use with harrows of different kinds.

With these and other objects in view my invention consists in the construction, arrangement and combination of the various parts of the device, whereby the objects contemplated are attained, as hereinafter more fully set forth pointed out in my claims and illustrated in the accompanying drawings, in which:

Figure 1 shows a top or plan view of a harrow cart embodying my invention.

Fig. 2 shows a vertical, sectional view taken on the line 2—2 of Fig. 1.

Fig. 3 shows a side elevation of my invention, and

Fig. 4 shows a detail, sectional view taken on the line 4—4 of Fig. 1.

In the accompanying drawings, I have used the reference numeral 10 to indicate generally the draw bar of a harrow to which are suitably secured proper draft devices 11.

My improved harrow cart comprises a central U-shaped frame 12 opening forwardly and preferably made of angle iron with a horizontal flange, and with a downwardly extending flange at its outer edge.

The upper horizontal flange of the frame 12 at the forward ends thereof, on each side of said frame, is provided with a plurality of openings to receive bolts 13.

Received beneath the horizontal flanges and adjacent to the vertical flange members of the forward ends of the frame 12 are bars 14, each provided with a plurality of vertical openings 15 in which the bolts 13 are selectively received. The bars 14 are provided forwardly of the frame 12 with outwardly diverging and forwardly extending portions 16, which at their forward ends, are bolted to the draw bar 10.

I provide at the rear portion of the harrow cart, a bar of iron or steel, having at its rear, central portion a forwardly opening U-shaped yoke 17, adapted to rotatably receive a shank 18, at the upper end of a bracket 19, which extends downwardly and rearwardly from the shank, and carries at its lower end a caster wheel 20.

The arms 23 of the bar, just mentioned, extend forwardly and diverge, and are extended through suitable openings 21 in the vertical flange of the frame 12, and are bolted to the inner surfaces of said flange on opposite sides of the frame 12, at 22.

It will thus be seen that the arms 23, by extending through the openings in the vertical flanges of the frame 12 form a frame in combination with the frame 12 of great strength and rigidity, and of extremely simple construction.

Suitably supported on the frame 12 is a seat 24.

The length of the harrow cart may be varied by selectively extending the bolts 13 through different holes 15 in the bars 14.

The forward ends of the U-shaped member 17 are connected by means of a transverse bolt 27. The forward ends of the portions 16 are bent downwardly, so that at their rearward ends they may give sufficient height to the frame of the harrow cart.

The bars 14 just forwardly of the U-shaped member 17 are connected by a transverse brace 28.

The entire harrow cart when complete is of very light weight and imposes comparatively little draft on the horses drawing the harrow.

The harrow cart can be quickly and easily removed from the harrow by removing the bolts 26 which secure the forward ends of the portions 16 to the draw bar 10.

Some changes may be made in the construction and arrangement of the parts of my improved harrow cart without departing from the essential features and purposes of my invention, and it is my intention to cover by the claims of the patent to be issued upon this application any modified forms of structure or use of mechanical equivalent, which may be reasonably included within the scope of my claims.

I claim as my invention:

1. A harrow cart comprising a forwardly opening U-shaped frame member, made of angle iron, having an upper horizontal flange and an outer downwardly extending flange, bars adjustably connected with the forward ends of said frame, said bars having at their forward ends diverging forwardly extending portions, means for securing said portions to the draw bar of a harrow, a forwardly opening U-shaped device extending rearwardly of said frame having at its forward ends forwardly extending diverging arms, said frame having openings through which said arms are extended, and means for securing said arms to said frame forwardly of said openings, and a caster wheel supported on said last described U-shaped member.

2. In a device of the class described, a U-shaped frame member, a second frame member secured to the rearward portion thereof, caster wheels supported on said second frame member, bars secured to the forward ends of said U-shaped frame, longitudinally adjustable thereon, said bars having arms extending forwardly and downwardly and diverging from each other adapted to be mounted on the draw bar of a harrow.

Des Moines, Iowa, June 21, 1917.

JAY GOULD BRIDENSTINE.

Copies of this patent may be obtained for five cents each, by addressing the "Commissioner of Patents, Washington, D. C."